United States Patent
Qiao et al.

(10) Patent No.: US 11,600,417 B2
(45) Date of Patent: Mar. 7, 2023

(54) PERMANENT MAGNET FOR MOTOR, ROTOR ASSEMBLY HAVING SAME, MOTOR, AND COMPRESSOR

(71) Applicant: ANHUI MEIZHI PRECISION MANUFACTURING CO., LTD., Anhui (CN)

(72) Inventors: Zhengzhong Qiao, Anhui (CN); Liyu Zheng, Anhui (CN); Xiaohua Qiu, Anhui (CN)

(73) Assignee: ANHUI MEIZHI PRECISION MANUFACTURING CO., LTD., Wuhu (CN)

( * ) Notice: Subject to any disclaimer, the term of this patent is extended or adjusted under 35 U.S.C. 154(b) by 150 days.

(21) Appl. No.: 15/930,685

(22) Filed: May 13, 2020

(65) Prior Publication Data

US 2020/0273612 A1 Aug. 27, 2020

Related U.S. Application Data

(63) Continuation of application No. PCT/CN2018/086760, filed on May 14, 2018.

(30) Foreign Application Priority Data

Nov. 24, 2017 (CN) ......................... 201711188364.7
Nov. 24, 2017 (CN) ......................... 201721598838.0

(51) Int. Cl.
*H01F 1/057* (2006.01)
*H01F 7/02* (2006.01)
(Continued)

(52) U.S. Cl.
CPC ............... *H01F 7/02* (2013.01); *H01F 1/057* (2013.01); *H02K 1/276* (2013.01); *H02K 21/02* (2013.01)

(58) Field of Classification Search
None
See application file for complete search history.

(56) References Cited

U.S. PATENT DOCUMENTS 7,824,506 B2 * 11/2010 Machida ............... H01F 1/0577
148/101
2016/0118848 A1 * 4/2016 Raminosoa ............ H02K 1/02
310/154.01

FOREIGN PATENT DOCUMENTS

CN 102362417 A 2/2012
CN 103276284 A 9/2013
(Continued)

OTHER PUBLICATIONS

Machine translation of CN 106059141A. (Year: 2016).*
(Continued)

*Primary Examiner* — Xiaowei Su
(74) *Attorney, Agent, or Firm* — Scully Scott Murphy & Presser

(57) ABSTRACT

A permanent magnet for a motor, a rotor assembly having the permanent magnet, a motor, and a compressor are disclosed. The permanent magnet has a Nd—Fe—B-based main phase. The main phase has a grain size of smaller than or equal to 4 micrometers. The mass ratio of dysprosium and/or terbium in the permanent magnet is less than or equal to 0.5%. The intrinsic coercivity Hcj of the permanent magnet at 25° C. satisfies Hcj≥1500 kA/m. The permanent magnet according to embodiments of the present disclosure can have fewer or no heavy rare-earth elements, and meanwhile exhibit excellent performance, which improves the cost performance.

11 Claims, 5 Drawing Sheets

(51) Int. Cl.
*H02K 1/276* (2022.01)
*H02K 21/02* (2006.01)

(56) References Cited

FOREIGN PATENT DOCUMENTS

| | | | |
|---|---|---|---|
| CN | 103858185 A | 6/2014 | |
| CN | 106059141 A | 10/2016 | |
| CN | 205647046 U | 10/2016 | |
| CN | 107707051 A | 2/2018 | |
| JP | H08-335506 A | 12/1996 | |
| JP | H10-125516 A | 5/1998 | |
| JP | H10-130796 A | 5/1998 | |
| JP | 2002-151314 A | 5/2002 | |
| JP | 2014-128101 A | 7/2014 | |
| JP | 2016-122862 A | 7/2016 | |
| JP | 2016-129249 A | 7/2016 | |
| JP | 2016-195490 A | 11/2016 | |

OTHER PUBLICATIONS

Notice of Reasons for Refusal dated May 11, 2021 received in Japanese Patent Application No. JP 2020-543665 together with an English language translation.
International Search Report dated Aug. 20, 2018 received in International Application No. PCT/CN2018/086760 together with an English language translation.
First Office Action dated Jun. 14, 2019 received in Chinese Patent Application No. CN 201711188364.7 together with an English language translation.
Second Office Action dated Mar. 27, 2020 received in Chinese Patent Application No. CN 201711188364.7 together with an English language translation.
Extended European Search Report dated Dec. 15, 2020 received in European Patent Application No. EP 18881175.6.
Notice of the Third Examination Opinion dated Feb. 2, 2021 received in Chinese Patent Application No. CN 201711188364.7 together with an English language translation.

* cited by examiner

PERMANENT MAGNET FOR MOTOR, ROTOR ASSEMBLY HAVING SAME, MOTOR, AND COMPRESSOR

FIELD

The present disclosure generally relates to the field of compressors, and more particularly to a permanent magnet for a motor, a rotor assembly having the permanent magnet, a motor, and a compressor.

BACKGROUND

In the field of compressors, high energy efficiency is a subject of long-term research and application, and hence the high performance of a permanent magnet of a permanent magnet-driven motor of an inverter compressor is a long-term research topic. In order to achieve high reliability, rare earth permanent magnets with heavy rare earth elements have long been the first choice of permanent magnets for permanent magnet motors of high-performance compressors. The heavy rare earth material is a strategic national resource on the one hand, and is expensive on the other hand, which makes the compressor equipped with such a permanent magnet have low cost performance.

To ensure the reliable operation of the compressor at high temperature without demagnetization, the intrinsic coercivity of the rare earth permanent magnet is required to be $Hcj \geq 1500$ kA/m or higher. In order to meet the aforementioned requirement for the intrinsic coercivity, heavy rare earth elements, such as dysprosium or/and terbium, of more than 3% or even more than 5% of the permanent magnet are added into the permanent magnet, according to the related art.

In recent years, the surface diffusion technique of heavy rare earth has been studied and applied, and on the premise of achieving the same performance, the proportion of heavy rare earth elements added to the permanent magnet has been greatly reduced, which improves the cost performance of the compressor to a certain extent. However, the proportion of heavy rare earth elements in the permanent magnets employing the surface diffusion technique still reaches 1% to 3%, and the cost performance of the permanent magnets is still low.

SUMMARY

The present disclosure aims to solve at least one of the technical problems existing in the related art. Accordingly, the present proposes a permanent magnet that can have fewer or no heavy rare-earth elements and meanwhile exhibit excellent performance, which improves the cost performance.

The present disclosure further proposes a rotor assembly having the above permanent magnet.

The present disclosure further proposes a motor having the above rotor assembly.

The present disclosure further proposes a compressor having the above motor.

For the permanent magnet according to embodiments of the present disclosure, the permanent magnet has a main phase of neodymium iron boron, the main phase has a grain size of smaller than or equal to 4 microns, a mass ratio of dysprosium and/or terbium elements in the permanent magnet is less than or equal to 0.5%, and the permanent magnet has intrinsic coercivity Hcj at 25° C. that satisfies: $Hcj \geq 1500$ kA/m.

The permanent magnet according to the embodiments of the present disclosure can have fewer or no heavy rare-earth elements and meanwhile exhibit excellent performance, which improves the cost performance.

In addition, the permanent magnet according to the embodiments of the present disclosure may have the following technical features.

In some embodiments of the present disclosure, the remanence Br of the permanent magnet at 25° C. satisfies: $Br \geq 1.2$ T.

In some embodiments of the present disclosure, a maximum magnetic energy product (BH)max of the permanent magnet at 25° C. satisfies: $(BH)max \geq 300$ kJ/m³.

Optionally, a mass ratio of gadolinium and/or holmium elements in the permanent magnet is less than or equal to 0.5%.

In some embodiments of the present disclosure, an area of a working surface of the permanent magnet is less than or equal to a product of a maximum length and a maximum width of the working surface of the permanent magnet.

Further, the working surface of the permanent magnet is rectangular.

Further, the working surface has at least one of a notch and a hole.

The rotor assembly according to embodiments of the present disclosure include the permanent magnet according to the embodiments of the present disclosure.

Optionally, the rotor assembly includes: a rotor core, having a plurality of magnet grooves extending along an axial direction of the rotor core and spaced apart along a circumferential direction of the rotor core, each magnet groove being provided with the permanent magnet therein; two end plates provided at two axial ends of the rotor core; and at least one counterbalance, at least one of the two end plates being provided with the counterbalance.

The motor according to embodiments of the present disclosure include the rotor assembly according to the embodiments of the present disclosure.

The compressor according to embodiments of the present disclosure include the motor according to the embodiments of the present disclosure.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

Figure 1:
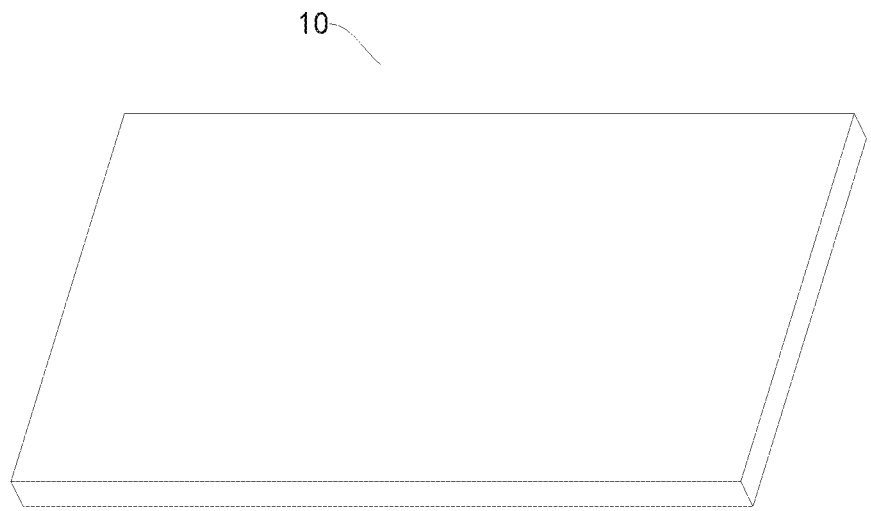
FIG. 1 is a schematic view of a permanent magnet according to an embodiment of the present disclosure.

REFERENCE NUMERALS compressor 100,
motor 110, cylinder 120, main bearing 130, auxiliary bearing 140, piston 150, crankshaft 160,
rotor assembly 111, magnet groove 101, stator assembly 112, stator core 1121, stator winding 1122,
permanent magnet 10, working surface 11, rotor core 20, end plate 30, counterbalance 40.

DETAILED DESCRIPTION OF EMBODIMENTS

Embodiments of the present disclosure will be described in detail below, and examples of the embodiments will be illustrated in drawings. The embodiments described herein with reference to the drawings are explanatory and are intended to illustrate the present disclosure. The embodiments shall not be construed to limit the present disclosure. It would be appreciated by those skilled in the art that various changes, modifications, alternatives and variations can be made in the embodiments without departing from principles and purposes of the present disclosure. The scope of the present disclosure is defined by the claims and their equivalents.

In the description of the present disclosure, it is to be understood that terms such as "length," "width," "upper," "lower," "inner," "outer," "axial," "circumferential" and "radial" should be construed to refer to the orientation as then described or as shown in the drawings under discussion. These relative terms are for convenience and simplicity of description and do not indicate or imply that the device or element referred to must have a particular orientation or be constructed and operated in a particular orientation. Thus, these terms shall not be construed to limit the present disclosure. In the description of the present disclosure, "a plurality of" means two or more than two, unless specified otherwise.

FIG. 1 is a perspective schematic view of a permanent magnet 10 according to an embodiment of the present disclosure. The permanent magnet 10 according to the embodiment of the present disclosure has a main phase of neodymium iron boron, the main phase has a grain size of smaller than or equal to 4 microns, and a mass ratio of dysprosium and/or terbium elements in the permanent magnet 10 is less than or equal to 0.5%. Herein, the mass ratio is a ratio of the mass of dysprosium and/or terbium elements to the total mass of the permanent magnet 10. That is, when the permanent magnet 10 contains one of dysprosium and terbium elements, the ratio of the mass of the one of the dysprosium and terbium elements to the total mass of the permanent magnet 10 is less than or equal to 0.5%. When the permanent magnet 10 contains both dysprosium and terbium elements, the ratio of the total mass of the dysprosium and terbium elements to the total mass of the permanent magnet 10 is less than or equal to 0.5%. The permanent magnet 10 satisfying the above conditions has intrinsic coercivity Hcj at 25° C. that satisfies: Hcj≥1500 kA/m, such that the anti-demagnetization ability is improved, and the performance of a motor 110 becomes stable and reliable.

In the related art, the magnitude of the intrinsic coercivity Hcj is controlled by the content of heavy rare earth elements (Dy, Tb, etc.). To meet the requirement for the intrinsic coercivity, the amount of heavy rare earth elements such as Dy or Tb generally needs to be more than 3%, or even more than 5%. The amount of heavy rare earth elements is large, and the cost is high. In the related art, the surface diffusion technique is also used for preparation, but the proportion of heavy rare earth elements still reaches 1% to 3%, that is, the amount of reduction is not obvious. Hence, the cost performance of the permanent magnet 10 is still low.

The permanent magnet 10 according to the embodiment of the present disclosure no longer satisfies the requirement for the intrinsic coercivity and other requirements through the conventional method of adding heavy rare earth elements or the surface diffusion technique, but adopts a new method, that is, the intrinsic coercivity of the permanent magnet 10 is adjusted by controlling the composition and grain size of the main phase. For example, the main phase of the permanent magnet 10 is neodymium iron boron, and the grain size of the main phase is less than or equal to 4 microns, for example but not limited to, 1 micron, 2 microns, or 3 microns.

It has been verified by experiments that magnetic properties of the permanent magnet 10 can also be at a good level when the mass ratio of the dysprosium and/or terbium elements in the permanent magnet 10 is less than or equal to 0.5%. For example, the intrinsic coercivity Hcj of the permanent magnet 10 at 25° C. can satisfy: Hcj≥1500 kA/m. Thus, the anti-demagnetization ability is strong, expensive heavy rare earth elements can be saved, and the diffusion technique can be omitted, which greatly reduces the cost of the permanent magnet 10 and improves the cost performance. The permanent magnet 10 according to the embodiment of the present disclosure has lowered cost, excellent performance, high reliability, and improved cost performance.

In some embodiments of the present disclosure, the remanence Br of the permanent magnet 10 at 25° C. may satisfy: Br≥1.2 T. Therefore, the magnetic flux density output from the permanent magnet 10 is large, and the magnetic properties are strong; moreover, the efficiency of the motor 110 is high, and the cost can be kept low. In some embodiments of the present disclosure, the maximum magnetic energy product (BH)max of the permanent magnet 10 at 25° C. can satisfy: (BH)max≥300 kJ/m$^3$, which results in strong magnetic properties and low cost.

In some optional embodiments of the present disclosure, the permanent magnet 10 can also be provided with gadolinium and/or holmium elements which are also beneficial to improvement of the magnetic properties, and the mass ratio of the gadolinium and/or holmium elements in the permanent magnet 10 is less than or equal to 0.5%. Thus, the motor 110 can have excellent magnetic properties, and the cost can be controlled.

Figure 2:
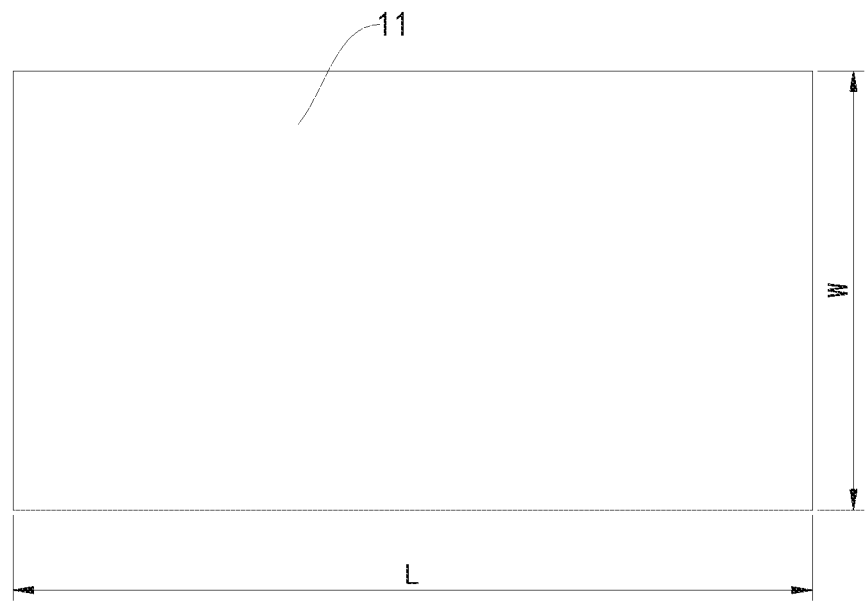
FIG. 2 is a schematic view of a working surface of a permanent magnet according to an embodiment of the present disclosure.
Figure 3:
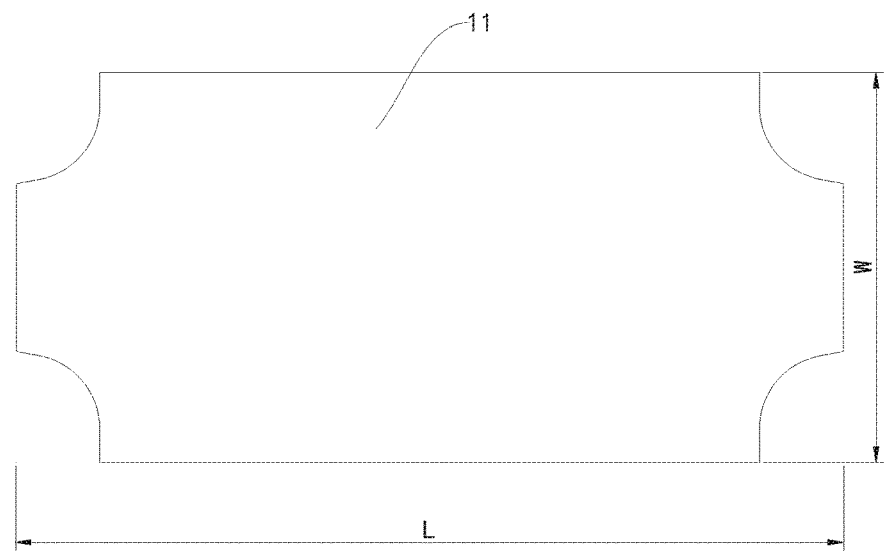
FIG. 3 is a schematic view of a working surface of a permanent magnet according to another embodiment of the present disclosure.

In the present disclosure, the shape of a working surface 11 of the permanent magnet 10 is not particularly limited, and the shape of the working surface 11 of the permanent magnet 10 can be flexibly set according to actual situations, to facilitate manufacturing and installation and maintain excellent performance. For example, the working surface 11 may be rectangular or trapezoidal. The rectangle may be a complete shape with no notches at the corners, as shown in FIG. 2, and may have a notch and/or a hole. Herein, the notch may be provided at an edge of the rectangle, for example, to form a recess, or may be provided at the corner, for example, to form a corner cut; the hole may be provided inside the rectangle, for example, disposed adjacent to an edge of the working surface 11 and extending along an axial direction of the motor 110. For example, as shown in FIG. 3, four corners of the rectangular working surface 11 are all provided with notches. The permanent magnet 10 of these structures has an advantage of high utilization rate of the end magnetic flux.

In some embodiments of the present disclosure, an area of the working surface 11 of the permanent magnet 10 is less than or equal to a product of a maximum length L and a maximum width W of the working surface 11 of the permanent magnet 10. For example, as shown in FIG. 2, when the working surface 11 of the permanent magnet 10 is formed as a rectangle without notches, the area of the working surface 11 of the permanent magnet 10 is equal to the product of the maximum length L and the maximum width W of the working surface 11 of the permanent magnet 10; for another example, as shown in FIG. 3, when the working surface 11 of the permanent magnet 10 is a rectangle with notches, the area of the working surface 11 of the permanent magnet 10 is smaller than the product of the maximum length L and the maximum width W of the working surface 11 of the permanent magnet 10. Herein, the working surface 11 of the permanent magnet 10 is generally perpendicular to the axial direction of the motor 110. The term "rectangle" may be understood to include squares.

Figure 4:
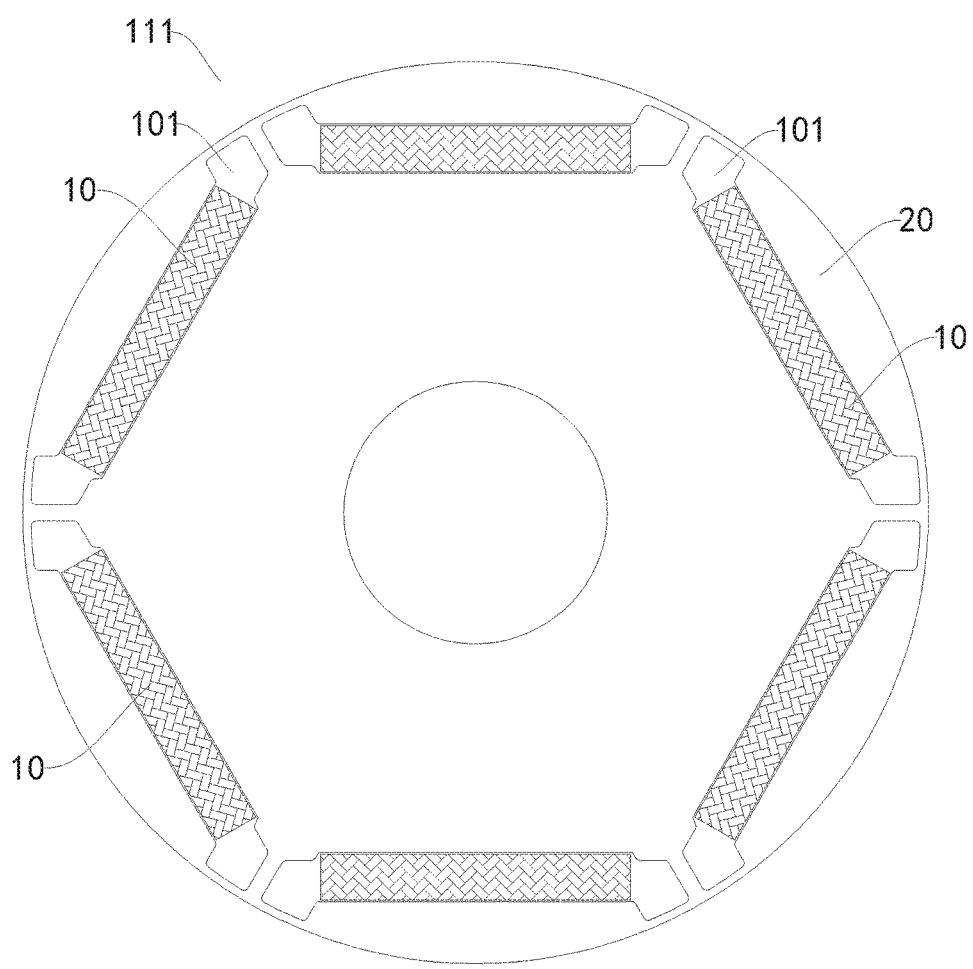
FIG. 4 is a radial sectional view of a rotor assembly according to an embodiment of the present disclosure.
Figure 5:
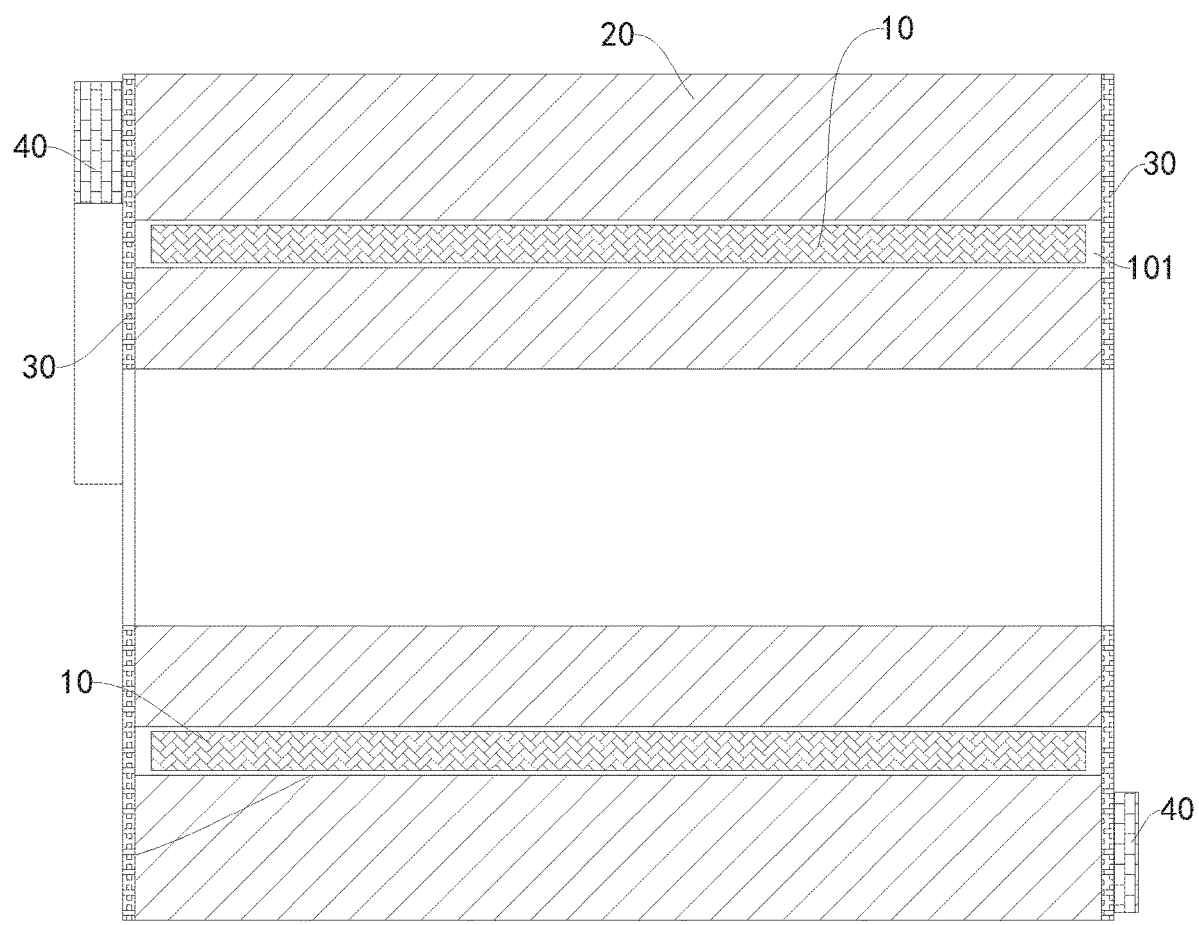
FIG. 5 is an axial sectional view of a rotor assembly according to an embodiment of the present disclosure.

As shown in FIGS. 4 and 5, a rotor assembly 111 according to embodiments of the present disclosure includes the permanent magnet 10 according to the above embodiments of the present disclosure. Since the permanent magnet 10 according to the embodiments of the present disclosure has the beneficial technical effects described above, the rotor assembly 111 according to the embodiments of the present disclosure has excellent electromagnetic properties and low cost.

In some embodiments, the rotor assembly 111 may include a rotor core 20, two end plates 30, and a counterbalance 40. The rotor core 20 has a plurality of magnet grooves 101 extending along its axial direction and spaced apart along its circumferential direction. That is, the rotor core 20 has the plurality of magnet grooves 101, the magnet grooves 101 are spaced apart from each other along the circumferential direction of the rotor core 20, and each magnet groove 101 extends along the axial direction of the rotor core 20. Each magnet groove 101 is provided with the permanent magnet 10 therein, and the two end plates 30 are provided at two axial ends of the rotor core 20, to limit the axial movement of the permanent magnet 10. At least one of the two end plates 30 is provided with a counterbalance 40. That is, there may be one counterbalance 40, and it may be provided on either of the two end plates 30; there may be two counterbalances 40, and each end plate 30 may be provided with the counterbalance 40, to improve the dynamic balance during rotation of the rotor.

In the present disclosure, the connection mode among the rotor core 20, the end plate 30, and the counterbalance 40 is not particularly limited, and may include but not be limited to rivet connection, bolt connection, welding, and bonding.

Figure 6:
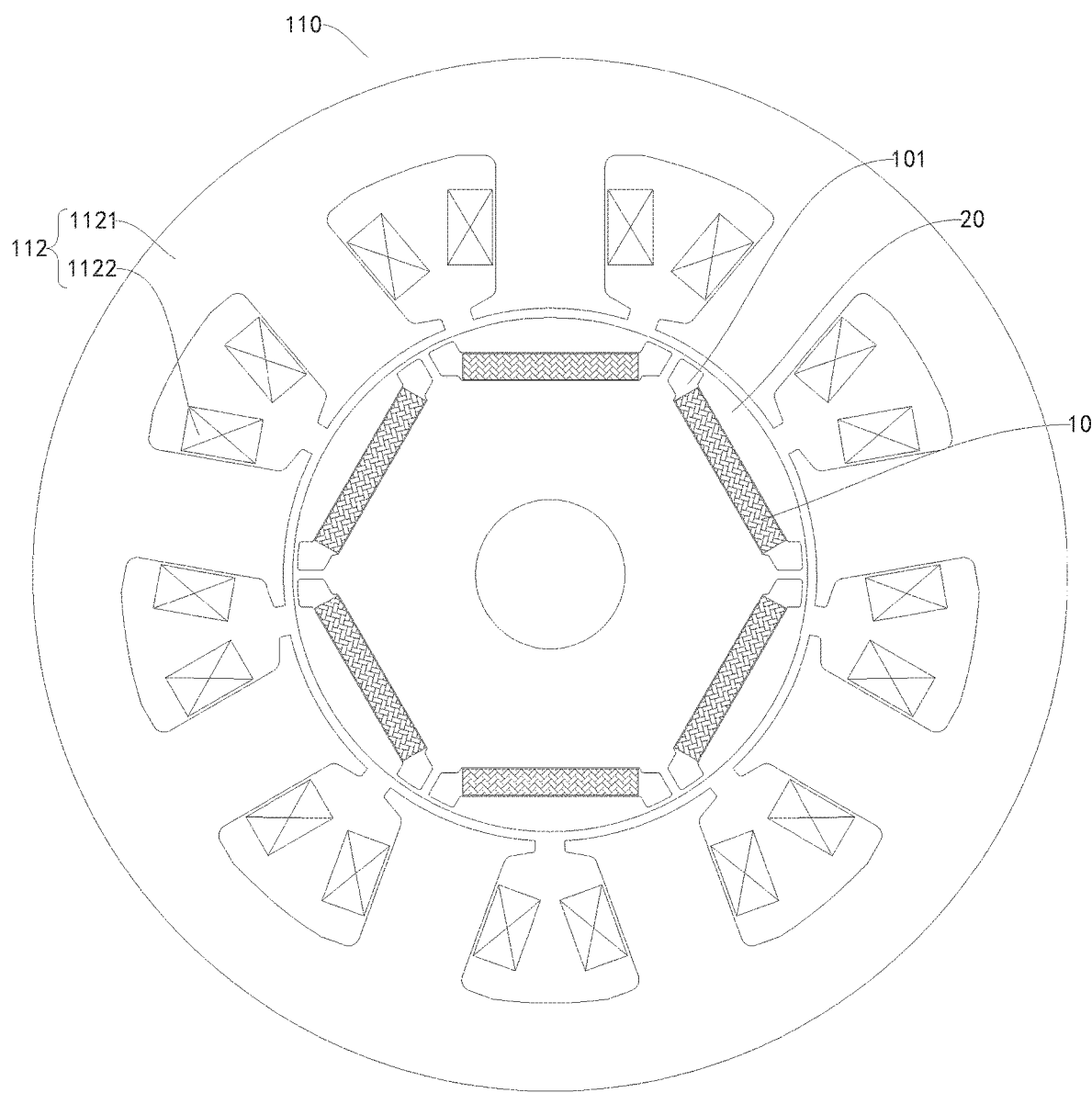
FIG. 6 is a radial sectional view of a motor according to an embodiment of the present disclosure.

As shown in FIG. 6, the motor 110 according to embodiments of the present disclosure includes the rotor assembly 111 according to the embodiments of the present disclosure. Since the rotor assembly 111 according to the embodiments of the present disclosure has the beneficial technical effects described above, the rotor assembly 111 according to the embodiments of the present disclosure has excellent electromagnetic properties and low cost. It could be understood that the motor 110 further includes a stator assembly 112, and the stator assembly 112 includes a stator core 1121 and a stator winding 1122. These structures are known to those skilled in the art and will not be elaborated herein.

Figure 7:
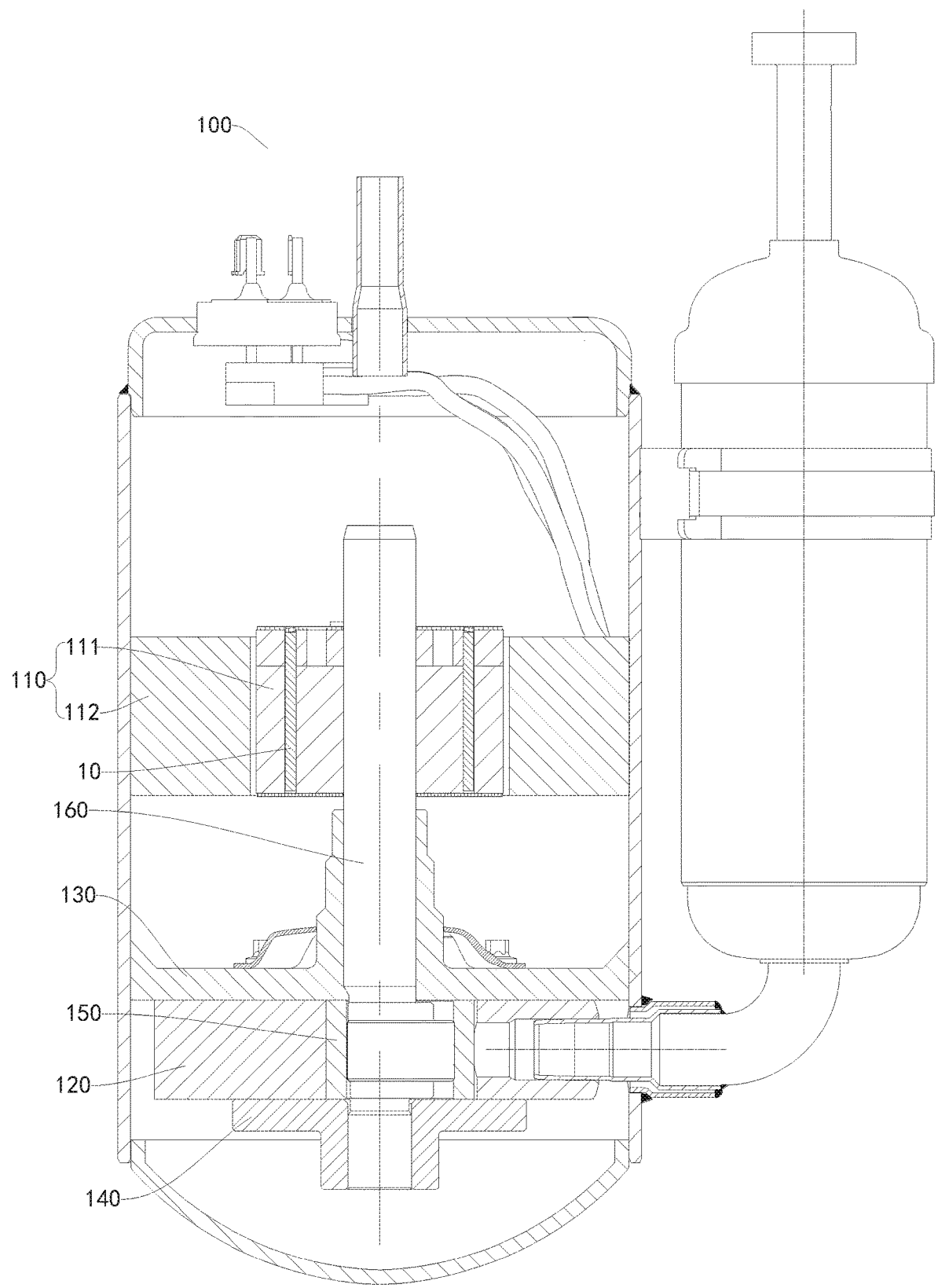
FIG. 7 is a schematic view of a compressor according to an embodiment of the present disclosure.

As shown in FIG. 7, a compressor 100 according to embodiments of the present disclosure includes the motor 110 according to the embodiments of the present disclosure. Since the motor 110 according to the embodiments of the present disclosure has the above-mentioned beneficial technical effects, the compressor 100 according to the embodiments of the present disclosure also has the above beneficial technical effects. It could be understood that the compressor 100 further includes compression components, such as a cylinder 120, a main bearing 130, an auxiliary bearing 140, a piston 150, and a crankshaft 160. Other configurations and operations of the compressor 100 according to the embodiments of the present disclosure are known to those skilled in the art and will not be elaborated herein.

In the description of the present disclosure, it should be noted that, unless specified or limited otherwise, the terms "mounted," "connected," "coupled," and the like are used broadly, and may be, for example, fixed connections, detachable connections, or integral connections; may also be mechanical or electrical connections; may also be direct connections or indirect connections via intervening structures; may also be inner communications of two elements, which could be understood by those skilled in the art according to specific situations.

Reference throughout this specification to "an embodiment," "a specific example," or "an example," means that a particular feature, structure, material, or characteristic described in connection with the embodiment or example is included in at least one embodiment or example of the present disclosure. Thus, the appearances of these phrases in various places throughout this specification are not necessarily referring to the same embodiment or example of the present disclosure. Furthermore, the particular features, structures, materials, or characteristics may be combined in any suitable manner in one or more embodiments or examples, in a case of no interference or contradiction.

What is claimed is:

1. A permanent magnet for a motor, comprising:
a main phase of neodymium iron boron, and
dysprosium and/or terbium elements,
wherein the main phase has a grain size of smaller than or equal to 1 micron, and the mass ratio of the dysprosium and/or terbium elements in the permanent magnet is equal to 0.5%, and
wherein the permanent magnet has intrinsic coercivity Hcj at 25° C. that satisfies: Hcj≥1500 kA/m,
wherein the permanent magnet further comprises gadolinium and/or holmium elements and the mass ratio of the gadolinium and/or holmium elements in the permanent magnet is equal to 0.5%, and
wherein an area of a working surface of the permanent magnet is less than or equal to a product of a maximum length and a maximum width of the working surface of the permanent magnet.

2. The permanent magnet according to claim 1, wherein a remanence Br of the permanent magnet at 25° C. satisfies: Br≥1.2 T.

3. The permanent magnet according to claim 1, wherein a maximum magnetic energy product (BH)max of the permanent magnet at 25° C. satisfies: (BH)max≥300 kJ/m³.

4. The permanent magnet according to claim 1, wherein the permanent magnet comprises both the gadolinium element and the holmium element and the total combined mass ratio of the gadolinium and holmium elements in the permanent magnet is equal to 0.5%.

5. The permanent magnet according to claim 1, wherein the permanent magnet comprises both the dysprosium element and the terbium element and the total combined mass ratio of the dysprosium and terbium elements in the permanent magnet is equal to 0.5%.

6. The permanent magnet according to claim 1, wherein the working surface of the permanent magnet is rectangular.

7. The permanent magnet according to claim 6, wherein the working surface has a notch, or a hole, or the combination of a notch and a hole.

8. A rotor assembly comprising the permanent magnet according to claim 1.

9. The rotor assembly according to claim 8, comprising:
a rotor core, having a plurality of magnet grooves extending along an axial direction of the rotor core and spaced apart along a circumferential direction of the rotor core, each magnet groove being provided with the permanent magnet therein;
two end plates provided at two axial ends of the rotor core; and
at least one counterbalance, at least one of the two end plates being provided with the at least one counterbalance.

10. A motor comprising the rotor assembly according to claim 8.

11. A compressor comprising the motor according to claim 10.

* * * * *